United States Patent [19]

Derr, Jr.

[11] 4,423,991

[45] Jan. 3, 1984

[54] CAM ACTIVATED PLANETARY TURNING MACHINE

[75] Inventor: Ralph Derr, Jr., Downingtown, Pa.

[73] Assignee: Gulf & Western Manufacturing Company, Southfield, Mich.

[21] Appl. No.: 324,311

[22] Filed: Nov. 23, 1981

[51] Int. Cl.³ .............................................. B21D 51/54
[52] U.S. Cl. ...................................... 409/200; 82/2 E; 29/1.32
[58] Field of Search ...................... 82/2 R, 2 E, 79, 80, 82/81; 29/1.32; 409/200, 199

[56] References Cited

U.S. PATENT DOCUMENTS 4,014,439  3/1977  Kochsiek et al. .................. 408/151

*Primary Examiner*—Leonidas Vlachos
*Attorney, Agent, or Firm*—A. Thomas Kammer

[57] ABSTRACT

An apparatus for turning or milling a workpiece is provided. The apparatus includes a first sleeve having an eccentric bore and a second sleeve positioned within this bore. The second sleeve also has an eccentric bore within which a tool mandrel or spindle is rotatably positioned. The sleeves are rotatable both as a unit and with respect to each other. When rotated with respect to each other, the axis of the mandrel may be moved off center to permit the turning or milling of the workpiece.

6 Claims, 3 Drawing Figures

CAM ACTIVATED PLANETARY TURNING MACHINE

BACKGROUND OF THE INVENTION

1. Field of the invention.

The field of the invention relates to an apparatus for turning or milling a workpiece.

2. Brief description of the prior art.

An important consideration in the design of metal cutting apparatus is the speed at which they may be operated. The workpiece should be able to be inserted, cut, and then withdrawn in a minimum of time. Durability, accuracy and reliability are other important considerations.

Metal cutting devices have being designed for a variety of purposes. These include threading, boring, recessing, and other functions. The positioning of the cutting mechanism with respect to the workpiece is important in all such devices.

One known device for turning a workpiece includes a worm and worm wheel operating drive. The apparatus is large and of substantial mass and does not lend itself to the high speed production of small parts as its eccentric housing assembly must come to zero rotational speed and be reversed before the workpiece can be withdrawn to the point of origin.

A number of patents disclose metal cutting devices having various means for adjusting the positions of the cutting mechanisms. U.S. Pat. No. 2,182,770, for example, employs an eccentrically bored sleeve which rotates with the housing. A shaft is positioned within the sleeve and includes cutter blades at one end thereof. The cutter blades are brought into engagement with a workpiece such as a pipe by rotating the sleeve with respect to the housing. This rotation is accomplished by means of pins having one end threaded to the housing and the other end positioned within diagonal slots within the sleeve.

U.S. Pat. Nos. 2,871,731, 3,233,480, 3,477,319 and 3,731,562 are representative of prior art metal cutting devices having similar means for adjusting the positions of their cutting mechanisms.

SUMMARY OF THE INVENTION

The invention is directed to a metal cutting apparatus which allows the high speed production of small circular parts. It is particularly directed to an apparatus for turning or milling a workpiece although its principles could be employed in conjunction with other cutting operations.

A mandrel or spindle including cutting means at one end is positioned within a first eccentrically bored sleeve. The first sleeve is positioned within a second eccentrically bored sleeve. Means are provided for rotating the sleeves as a unit and with respect to one another. When rotated with respect to one another, the axis of the mandrel moves thereby causing a change in position of the cutting means.

Means may be provided for resiliently urging the sleeves into a first position when the cutting operation is terminated for removal of the workpiece. After a succeeding workpiece is appropriately positioned, said means may be overcome by a sufficient force to move the cutting means into engagement therewith.

DETAILED DESCRIPTION OF THE INVENTION

Figure 1:
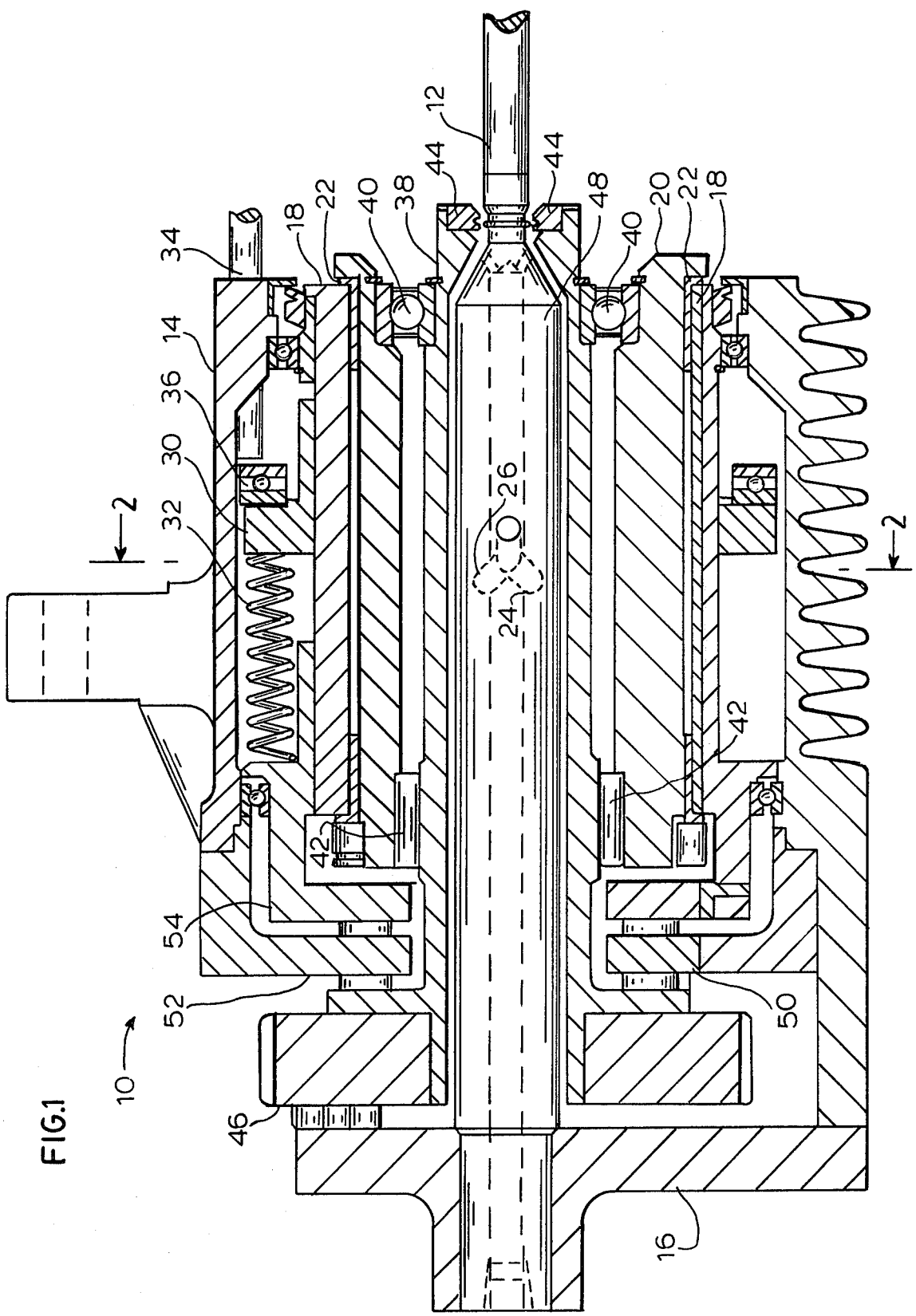
FIG. 1 is a sectional elevation view of a planetary turning machine according to the invention.
Figure 2:
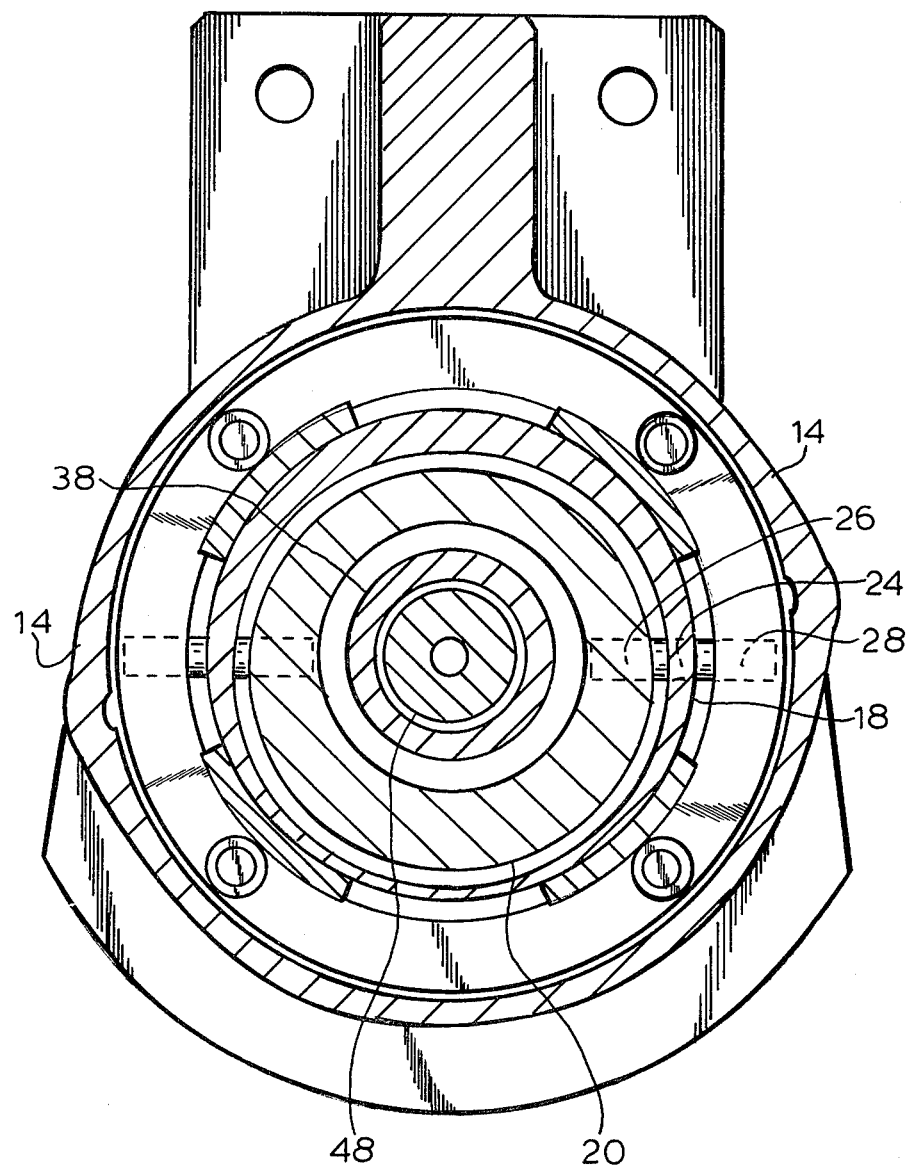
FIG. 2 is a sectional view taken along the plane of line 2—2 of FIG. 1.

A cam activated planetary turning apparatus 10 for treating a workpiece 12 is illustrated in FIGS. 1 and 2. The workpiece is an elongate metal piece to eventually be cut into a desired form.

The apparatus 10 includes a housing assembly 14 to which an end or top plate 16 is secured at one end thereof. A first rotatably mounted substantially cylindrical sleeve 18 is positioned within the housing assembly 14. The sleeve 18 includes an eccentric bore extending along its axial direction. A second sleeve 20 is rotatably positioned within this eccentric bore. Spacers 22 are provided between the sleeves to allow them to rotate with respect to each other with minimal frictional resistance.

Each sleeve 18, 20 includes at least one slot therein. The slot 24 within the first sleeve includes a first portion running parallel to its axis and a second contiguous portion extending helically with respect thereto. An obtuse angle is formed between the first and second portions.

The slot 26 within the second sleeve 20 is aligned with the slot 24 discussed above and has a similar configuration. The second portion of this slot also extends helically with respect to the axis of the sleeve, but forms an obtuse angle with its first portion in an opposing rotational direction from the corresponding portion of the first-mentioned slot 24.

A pin 28 extends through each of the aligned slots. Movement of the pin in a first axial direction causes the sleeves 18, 20 to rotate with respect to each other. Due to the configurations of the slots one sleeve rotates in a first direction while the other rotates in the opposite direction. One end of the pin 28 is secured to a pin carrier member 30 capable of reciprocal motion along an axis parallel to the axes of the sleeves. One or more springs 32 resiliently urge the carrier member 30 in a first direction such that the sleeves naturally assume the positions shown in FIG. 2. The spring force may be overcome through the use of a thrust rod 34 which exerts pressure through a bearing 36 positioned on the opposite side of the carrier member 30 from the spring 32. A second pin may be provided if a second pair of slots are formed within the sleeves.

A hollow tool mandrel 38 is rotatably mounted within the eccentric bore of the second sleeve 20. Bearings 40, 42 allow the mandrel to rotate freely within the bore while maintaining it at a desired distance from the inner wall of the sleeve. Cutting blades 44 are mounted at one end of the mandrel and extend radially inwardly with respect thereto. Alternatively, the blades could extend outwardly if the workpiece so requires. The opposite end of the mandrel is operationally engaged to a mandrel gear 46. A driving gear engages the mandrel gear 46. The cutting blades are rotated at a high speed when the workpiece is turned, cut or formed. A center post or part stop 48 is positioned within the mandrel.

The orbiting motion of the sleeves 18, 20 as a unit is achieved via a hunting tooth orbiting gear 50. The gear 50 functions as a planetary reducing drive. A reduction ratio between thirty and forty to one is contemplated. The orbiting gear 50 engages a fixed internal ring gear 52 and a driving internal ring gear 54 causing it to rotate the first and second sleeves 18, 20.

In operation, both the mandrel 38 and sleeves, 18, 20 are continuously rotated by means of the above-mentioned gears. FIG. 2 illustrates the apparatus in a "starting" position. In this position, the sleeves 18, 20 center the mandrel such that the workpiece 12 may be inserted therein. The thrust rod then causes the pin 28 to move within the slots 24, 26 thereby rotating the sleeves 18, 20 with respect to one another. The mandrel accordingly assumes an off-center position and moves about the circumference of the workpiece. By rotating the sleeves 18, 20 as a unit, the rotating blades 44 mill the workpiece into a desired shape. Upon completion of the milling operation, the thrust rod 34 is withdrawn to the starting position allowing spring 32 to move the pin carrier member 30 in the same direction. The sleeves 18, 20 and pin 28 are also returned to the starting position where removal of the finished workpiece and insertion of an untreated one occurs. During both the milling step and the changing of workpiece, the sleeve assembly 18, 20 rotates at a constant speed. This allows a faster machine cycle time in comparison with those machines employing a worm and worm gear. A cycle time of about one second is contemplated.

The same mechanism which causes the workpiece 12 to be introduced between and withdrawn from the cutter blades can be employed for simultaneously reciprocating the thrust rod 34. The cycle may be completed after the sleeve assembly has undergone at least one revolution.

Figure 3:
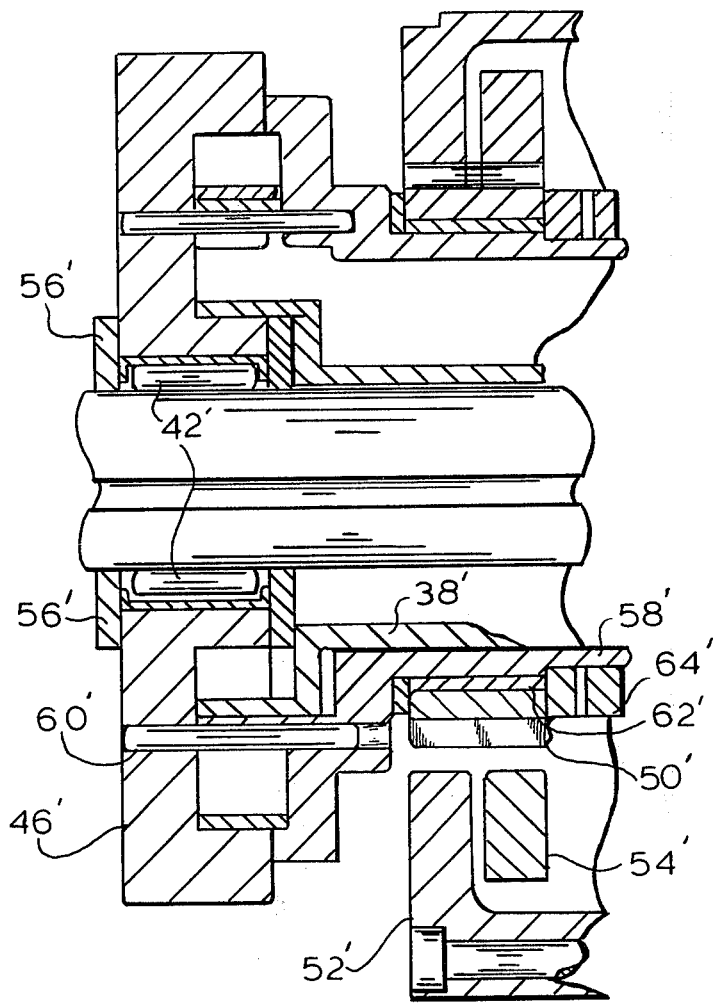
FIG. 3 is a sectional view of an alternative drive mechanism used in accordance with the invention.

An alternative drive mechanism is shown in FIG. 3 in conjunction with the invention. The mechanism includes a driven gear 46' mounted on needle bearings 42' supported by a central tool mandrel and between two thrust bearings 56'. In this embodiment, the driven (mandrel) gear 46' does not orbit.

A fixed internal ring gear 52', a rotating internal ring gear 54', and an orbiting gear 50' are also provided. The orbiting gear 50' serves substantially the same purpose as the orbiting gear 50 described with respect to the first embodiment. It operates at a comparatively lower rpm. The tool mandrel is designated by numeral 38' and corresponds to the mandrel shown in FIG. 1.

A third eccentric 58' supports the orbiting gear 50' and drives it around the fixed internal ring gear 52' and rotating internal ring gear 54'. The latter 54' is caused to rotate by the hunting tooth action. A driving pin 60' holds the driven gear 46' and the third eccentric 58' together thereby driving the tool mandrel 38'. In other words, the driving pin 60' cause the mandrel 38' to rotate as it is orbited about the workpiece. A plurality of driving pins may be employed, and four to six are incorporated in this embodiment. To permit the tool mandrel 38' to orbit while rotating, cavities of sufficiently large proportions are provided therein for accomodating the driving pins.

Gear bearings 62' are provided between the third eccentric 58' and the orbiting gear 50'. Bearings and lock or positioning nut 64' are positioned adjacent the third eccentric 58' further towards the front portion of the drive mechanism.

What is claimed is:
1. An apparatus for milling a workpiece, comprising:
    a housing assembly;
    a first sleeve having an eccentric bore therein rotatably mounted in said housing assembly;
    a second sleeve at least partially positioned within said eccentric bore for rotation within said first sleeve, said second sleeve having an eccentric bore therein;
    a mandrel at least partially positioned within said eccentric bore within said second sleeve for rotation therein;
    means on said housing assembly for rotating said mandrel;
    cutting means secured near a first end of said mandrel;
    means for rotating said first and second sleeves with respect to each other;
    means for rotating said first and second sleeves as a unit;
    said means for rotating said first and second sleeves with respect to each other including:
    a first slot within said first sleeve, said first slot including a helically disposed portion extending in a first rotational direction with respect to the axis of said first sleeve;
    a second slot within said second sleeve, said second slot including a helically disposed portion extending in a second rotational direction with respect to the axis of said second sleeve, said second rotational direction being opposite to said first rotational direction;
    a pin passing through both said first and second slots; and
    means for moving said pin in a direction parallel to the respective axes of said sleeves.

2. An apparatus as defined in claim 1 wherein said sleeves are orientated such that when said pin is in a first axial position, said mandrel is in a center position, and when said pin is in a second axial position, said mandrel is in an off-center position whereby it will move in an arc upon rotation of said first and second sleeves as a unit.

3. An apparatus as defined in claim 2 including means resiliently urging said pin in one direction.

4. An apparatus as defined in claim 3 wherein said one direction is towards said first axial position.

5. An apparatus as defined in claim 1 wherein said cutting means are blades extending radially inwardly with respect to said mandrel.

6. An apparatus as defined in claim 1 wherein said means for rotating said mandrel includes a driving pin inserted within a cavity within said mandrel, said cavity having a diameter sufficiently larger than the diameter of said driving pin to permit said mandrel to orbit about a workpiece inserted therein while rotating.

* * * * *